(12) United States Patent
Gupta

(10) Patent No.: US 11,928,653 B2
(45) Date of Patent: Mar. 12, 2024

(54) STYLUS ENABLED SMART CARD

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 16/882,482

(22) Filed: May 23, 2020

(65) Prior Publication Data

US 2021/0365907 A1 Nov. 25, 2021

(51) Int. Cl.
*G06Q 20/10* (2012.01)
*G06Q 20/18* (2012.01)
*G06Q 20/34* (2012.01)
*G06Q 20/40* (2012.01)

(52) U.S. Cl.
CPC .......... *G06Q 20/105* (2013.01); *G06Q 20/18* (2013.01); *G06Q 20/352* (2013.01); *G06Q 20/4012* (2013.01)

(58) Field of Classification Search
None
See application file for complete search history.

(56) References Cited

U.S. PATENT DOCUMENTS 3,622,991 A * 11/1971 Lehrer ...................... G06K 7/06
340/5.67
5,590,038 A * 12/1996 Pitroda .............. G06Q 20/4093
705/41
7,140,550 B2 * 11/2006 Ramachandran .. G06Q 20/3276
235/492
9,317,847 B2 * 4/2016 Candelore ............ G06Q 20/325
9,864,944 B2 1/2018 Radu et al.
10,043,122 B1 * 8/2018 Koeppel ............ G06Q 20/3672
2011/0174874 A1 * 7/2011 Poznansky ....... G06K 19/06206
235/379
2012/0197798 A1 * 8/2012 Grigg ................. G06Q 20/1085
705/43

(Continued)

OTHER PUBLICATIONS

Smart Payment Card Aims to Replace Multiple Credit Cards, https://q8allinone.com/2014/10/smart-payment-card-aims-to-replace-multiple-credit-cards.html (Year: 2014).*

(Continued)

*Primary Examiner* — David P Sharvin
*Assistant Examiner* — Brock E Turk
(74) *Attorney, Agent, or Firm* — Weiss & Arons LLP

(57) ABSTRACT

Wait times at ATMs may undermine the utility of these self-service machines. ATMs are configured to provide faster self-service kiosks that allow users to quickly perform common financial transactions. However, it has been increasing common for users to have to wait on a line to access an ATM. Apparatus and methods are provided for a smart card that stages transactions by capturing the amount, pin and other necessary information on the smart card itself, before the user begins interacting with the ATM. Information captured by the smart card may be transferred to ATM when the smart card is inserted into ATM. The user does not provide the ATM with any additional information after inserted the smart card into the ATM, thereby improving the transaction processing efficiency of the ATM and enhancing user satisfaction.

17 Claims, 8 Drawing Sheets

(56) References Cited

U.S. PATENT DOCUMENTS

| | | | | |
|---|---|---|---|---|
| 2013/0248594 A1* | 9/2013 | Soom | .................... | G07F 7/0846 |
| | | | | 235/492 |
| 2014/0172703 A1* | 6/2014 | Black | ...................... | G07F 19/20 |
| | | | | 705/43 |
| 2014/0209688 A1* | 7/2014 | Branca, Jr. | .......... | G06F 3/03545 |
| | | | | 235/492 |
| 2014/0380452 A1* | 12/2014 | Suwald | .................... | G07F 7/08 |
| | | | | 726/9 |
| 2015/0220714 A1* | 8/2015 | Davis | ...................... | G06F 21/32 |
| | | | | 705/325 |
| 2017/0337783 A1* | 11/2017 | Konecny | ............... | G07F 19/211 |
| 2019/0286805 A1 | 9/2019 | Law et al. | | |

OTHER PUBLICATIONS

Heater, Brian, Plastc, A Card-Sized Touchsreen Payment Device That Replaces Multiple Credit Cards, https://web.archive.org/web/20160325155650/https://laughingsquid.com/plastc-a-card-sized-touchscreen-payment-device-that-replaces-multiple-credit-cards/ (Year: 2014).*

* cited by examiner

STYLUS ENABLED SMART CARD

FIELD OF TECHNOLOGY

Aspects of the disclosure relate to improving transaction efficiency and operation of automated teller machines ("ATMs").

BACKGROUND OF THE DISCLOSURE

Wait times at ATMs may detract from the utility of these self-service kiosks. ATMs are deployed to provide self-service kiosks that allow users to quickly perform common financial transactions. However, it has been increasing common for users to have to wait on a line to access an ATM while other users complete their transactions at the ATM.

An ATM may be capable of processing a higher number of financial transactions per unit of time than a human teller. However, an ATM transaction typically requires numerous inputs from a user before a transaction may be initiated and completed. For example, the ATM may first require a user to insert a card, such as a debit card, into the ATM. The card may include account or other information that links the user to one or more financial accounts. Information stored on the card may include a unique identifier and username.

Based on the information stored on the card, the ATM may prompt the user to enter a personal identification number ("PIN") associated with the card. The PIN may be used to authenticate the user at the ATM. After authenticating the user, the ATM may then prompt for inputs such as amount of money, an account selection or other transaction details. The prompting for information by the ATM, and the subsequent entry of a response by the user, all increase an amount of time each user may spend at the ATM.

Others may need to wait while a prior user responds to the ATM prompts and completes their desired transaction. The lengthy wait time may increase user dissatisfaction and reduce a transaction efficiency of the ATM.

Some technology solutions exist for reducing the number of ATM prompts and required user responses. However, these solutions typically require additional third-party hardware and services, such as a mobile device or laptop/desktop computer system. These solutions, in addition to increasing costs associated with obtaining the third-party hardware and services, increases security risks. For example, a third-party device must be adequately secured to transmit and receive sensitive financial data. Communication between the third-party device and the ATM must also be secured. Furthermore, any sensitive financial data stored locally on the third-party device must be adequately secured to prevent unauthorized access to that data.

Accordingly, it would be desirable to reduce user wait-times at an ATM and improve the transaction efficiency of an ATM without relying on third-party hardware or services. It would be further desirable to improve the transaction efficiency of an ATM without imposing costs to procure and maintain third-party hardware or services. It would also be desirable to improve the transaction efficiency of an ATM without increasing security risks associated with third-party hardware and services.

Accordingly, it is desirable to provide apparatus and methods for a STYLUS ENABLED SMART CARD.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
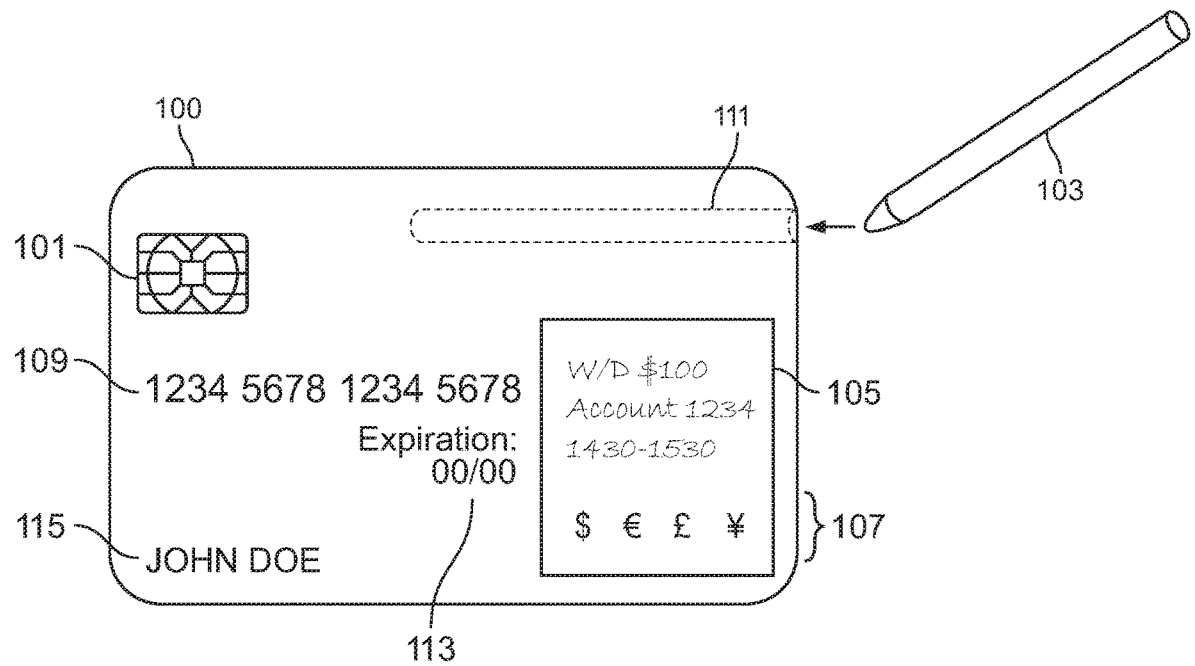
FIG. 1 shows illustrative apparatus in accordance with principles of the disclosure.

Apparatus for a smart card are provided. Apparatus may increase transaction processing efficiency of an Automated Teller Machine ("ATM") or other self-service kiosks.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided input. The I/O module may include one or more of a speaker for providing audio output and a display for providing textual, audiovisual and/or graphical output.

Software may be stored within the non-transitory memory and/or other storage media. The software may provide instructions to the microprocessor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, authentication services, and voice input and speech recognition applications. Application programs may utilize one or more algorithms that encrypt information, process received executable instructions, interact with an ATM, perform power management routines or other suitable tasks.

The smart card may include non-transitory memory locations within the housing. The microprocessor may access such memory locations. The non-transitory memory locations may be included in the microprocessor. The non-transitory memory locations may store software, that when executed by the microprocessor, cause the smart card to perform various functions. For example, the microprocessor may instruct a communication interface to scan for a wired or wireless communication channels and connect to a detected ATM.

The smart card may include a pressure sensitive button. The pressure sensitive button may have a thickness that is not greater than 0.8 mm. The pressure sensitive button may be actuated by a user to activate the smart card. Actuation of the pressure sensitive button may provide an electronic signal to the microprocessor or any other component of the smart card. For example, actuating the pressure sensitive button may activate the microprocessor, a keypad or a communication interface of the smart card.

In some embodiments, the smart card may be activated in response to receiving high frequency wireless signals. The high frequency signals may be detected by the communication interface. The high frequency signals may be broadcast by an ATM. The high frequency signals may be generated by a near field communication ("NFC") reader. The high frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more ATMs or other self-service kiosks. The smart card may connect to a local area network ("LAN"), a wide area network ("WAN") or any suitable network. When used in a LAN networking environment, the smart card may be connected to the LAN through a network interface or adapter. The communication interface may include the network interface or adapter.

When used in a WAN networking environment, the smart card may include a modem or other means for establishing communications over a WAN, such as the Internet. The communication interface may include the modem. It will be appreciated that the network connections shown are illustrative and other means of establishing a communications link between devices may be used. The existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones multiprocessor systems, microcomputers, minicomputers, mainframe computers, distributed computing environments that include any of the above systems or devices, and the like.

The smart card may utilize computer-executable instructions, such as program modules, being executed by the microprocessor. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad, the communication interface and the microprocessor. The battery may have a thickness that is not greater than 0.5 mm.

The battery may be recharged via an electrical contact when the smart card is in contact with an ATM. The smart card's power source may include high frequency signals received from an ATM or other self-service kiosk. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to a rechargeable battery when the smart card is inserted into an ATM card reader.

The smart card may include a communication interface. The communication interface may have a thickness that is not greater than 0.8 mm. The communication interface may include circuitry for establishing electronic communication with an ATM other self-service kiosk. The communication interface may be configured to implement protocols for wireless communication. The communication interface may include one or more antennae for transmitting and receiving wireless signals.

The communication interface may include communication circuitry. The communication circuitry may include software and/or hardware for establishing a wired or wireless communication channel with the ATM. The communication interface may be compatible with illustrative wireless channels such as Wi-Fi, Bluetooth, Ethernet, NFC, satellite and cellular telecommunications. Wi-Fi may include passive Wi-Fi with lower power consumption than typical Wi-Fi. The communication interface may include a Near Field Communication ("NFC") chip. The NFC chip may communicate over a typical NFC range (~2 in.) when transmitting or receiving sensitive data. An illustrative NFC chip may utilize a 13.56 MHz radio frequency.

A microprocessor of the smart card may be configured to dynamically limit or expand transmitting and receiving ranges. The microprocessor may dynamically limit or expand transmitting and receiving ranges in response to detected location of the smart card.

For example, the microprocessor may expand a communication range when the smart card is within a "familiar" zone. Expanding a communication range may include using a Wi-Fi communication channel rather than an NFC communication channel. Expanding a communication range may include using a typical Wi-Fi range such as 150-300 ft. when searching for available ATM wireless communication channel and using passive Wi-Fi after establishing the communication channel with the ATM.

A familiar zone may be a pre-defined radius from a user's home or work location. The microprocessor may limit a communication range when the smart card is within an "unknown" zone. For example, the microprocessor may limit a communication range when the user is travelling. The microprocessor may restrict the smart card to using NFC or contact-based communication channels when operating in an unknown zone.

In some embodiments, the smart card may be activated in response to receiving wireless signals from the ATM. The wireless signals may provide power to one or more components of the smart card. Illustrative wireless signals may include NFC signals. For example, in response to receiving power via the wireless signals, a microprocessor of the smart card may be activated.

The smart card may include a battery for powering the communication interface and the microprocessor. The smart card may include an electrical contact that may be used to establish a wired or contact-based connection to the ATM.

For example, the smart card may include an "EMV" chip. EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the ATM. The battery of the smart card may be recharged via the at least one electrical contact when the smart card is in contact with the ATM via the EMV chip.

The smart card may include a housing. The housing may provide a protective layer for internal components of the smart card. The housing may be flexible. The housing may be constructed from plastic or other suitable materials. The housing may define a form factor of the smart card. The microprocessor and other components of the smart card may be embedded in, and protected by, the housing.

For example, an ATM may include a card reader constructed to receive a card that conforms to a predefined form factor. As illustrative form factor is defined in specifications published by the International Organization for Standardization ("ISO"). Illustrative specifications may include: ISO/IEC 7810, ISO/IEC 7811 and ISO/IEC 7816, which are hereby incorporated herein by reference in their respective entireties.

The smart card may include a keypad. The keypad may be mounted on an outside of the housing. The keypad may include mechanical keys. The keypad may be mounted on an outside of the housing. The housing of the smart card may conform to the predefined form factor. The keypad may not increase the form factor of the smart card defined by the ATM for receiving the smart card. For example, the housing and the keypad mounted on an outside of the housing may collectively have a thickness that is not greater than 0.8 mm. An entire surface area of the smart card, including the keypad, may not exceed 86 mm×54 mm.

The ATM may utilize information stored on the smart card to authenticate a user at the ATM. In addition to information stored on the smart card, the ATM may prompt the user for additional information before allowing the user to initiate a transaction at the ATM. The additional information may include a PIN or biometric feature.

After authenticating the user, the ATM may allow the user to initiate a transaction at the ATM. Illustrative transactions may include withdrawing cash, transferring funds between accounts or depositing cash/checks.

A user of the smart card may enter data using the keypad. The data entered by the user may be captured by the microprocessor. The user may enter data via the keypad that would typically be requested by the ATM when authenticating the user. The user may enter data via the keypad that would typically be requested by the ATM to initiate a transaction on behalf of the user.

The keypad may allow the user to enter data that will be needed by the ATM before accessing the ATM. Entering data before accessing the ATM may reduce an amount of time the user spends entering data after accessing the ATM. Reducing the amount of time the user spends entering data at the ATM may, in turn, reduce the amount of time other users spend waiting to access to the ATM. Reducing the amount of time each user spends entering data at the ATM may increase the number of transaction that the ATM may process per unit of time. Thus, reducing the amount of time anyone user spends entering data at the ATM may increase the transaction processing efficiency of the ATM.

Data entered using the keypad may include authentication information that would typically be requested by an ATM before providing a user access to one or more services of the ATM. For example, the user may enter a PIN or biometric feature. The authentication information may be encrypted and stored on the smart card. After capturing the authentication information, the smart card may present the authentication information to the ATM without requiring any further input from the user.

Other illustrative authentication information that may be entered via the keypad may include a user's name, an expiration date of the smart card, a card verification value ("CVV") or any other suitable data. The user may enter authentication information such as a telephone number, address or zip code.

Data entered using the keypad may include transaction information that would typically be requested by an ATM before implementing one or more services of the ATM. For example, the user may enter a cash withdrawal amount, currency, bill denomination and currency using the keypad before reaching the ATM. The smart card may transmit the keyed-in transaction information to the ATM without requiring any further input from the user. The smart card may instruct the ATM to execute the withdrawal transaction without requiring any further input from the user.

In some embodiments, data entered using the keypad may be transferred to ATM when the smart card is inserted into or otherwise in communication with the ATM. In some embodiments, data entered using the keypad may be transferred to the ATM before the user inserts the smart card into the ATM. The data transferred to the ATM may be utilized by the ATM to complete transaction details that would have otherwise required prompting the user for inputs at the ATM. Capturing the data on the smart card before the user accesses the ATM reduces the amount of time a user needs to spend entering data at the ATM, thereby increasing the transaction processing efficiency of the ATM.

The smart card may include executable instructions. The executable instructions may be stored in a non-transitory memory. The executable instructions, when run by the microprocessor, may implement various functions of the smart card. The microprocessor may capture data entered using the keypad. The microprocessor may encrypt the captured data. The smart card may include a dedicated encryption controller for performing the encryption. The microprocessor may store the encrypted data locally on the smart card.

The microprocessor may formulate a set of transaction instructions executable by the ATM. The transaction instructions executable by the ATM may be formulated based on the data (e.g., transaction and authentication information) captured by the keypad. For example, the microprocessor may formulate transaction instructions for executing a transaction at the ATM. The microprocessor of the smart card may integrate the data captured from the keypad into the set of transaction instructions that are executable by the ATM.

The smart card may transfer the transaction instructions to the ATM. The smart card may transfer the transaction instructions in response to establishing a communication channel with the ATM. The communication interface may be used to establish the communication channel. For example, the smart card may establish the communication channel when the smart card is inserted into a card reader of the ATM. The ATM may autonomously initiate a transaction based on the authentication/transaction information included in transaction instructions stored on the smart card, thereby improving the transaction processing efficiency of the ATM.

For example, using the keypad, the smart card may capture a PIN and withdrawal amount from a user. The smart card may formulate a withdrawal request for the amount entered by the user. The smart card may formulate the withdrawal request before the user inserts the smart card into the ATM. The smart card may transfer the withdrawal request to the ATM for execution when the smart card is within a communication range of the ATM.

The smart card may include a communication interface that includes a wireless communication interface. The smart card may scan for a wireless communication channel broadcast by the ATM. The smart card may attempt to establish a connection to the ATM using the detected wireless communication channel. The smart card may establish the wireless communication channel to the ATM before the smart card is inserted into the ATM.

The wireless communication channel may only be used for transferring transaction instructions previously formulated by the smart card. In response to receiving transaction instructions, the ATM may initiate pre-processing of the user's desired transaction.

Pre-processing may include verifying any authentication information included in the set of transaction instructions. Pre-processing may include verifying that the user has sufficient funds available to warrant dispensing cash to the user. The pre-processing may determine that further input is needed from the user before dispensing cash.

For example, a user's account or ATM location may be associated with a specific fraud-mitigating protocol. The fraud-mitigating protocol may require a user to provide additional authentication information or verify previously provided authentication information before the ATM executes the transaction instructions received from the smart card.

The ATM may complete any pre-processing before the user approaches the ATM and inserts the smart card into the ATM. After completing the pre-processing, the ATM may detect that the smart card has been inserted into the ATM. The ATM may determine that it has pre-processed transaction instructions received from the smart card. The ATM may then execute the transaction implemented by the previously received transaction instructions without prompting the user for any additional data or inputs.

From a perspective of the user, the transaction may be executed in real time after the smart card is inserted into the ATM. For example, if the transaction instructions correspond to a withdrawal request, in response to inserting the smart card into the ATM, the ATM may provide the requested cash to the user.

In some embodiments, transaction instructions formulated by the microprocessor and stored locally on the smart card may not be transferred to the ATM before the smart card is inserted into the ATM. The built-in security protocols of an EMV chip on the smart card may provide verification of authentication information. After the ATM authenticates the user and the inserted smart card using the EMV chip, the smart card may then transfer the set of transaction instructions to the ATM.

Transaction instructions may be transferred to the ATM using a contact-based communication channel, such as via the EMV chip of the smart card. Such embodiments may provide an additional layer of fraud-mitigation by reducing the possibility that the set of transaction instructions may be intercepted during wireless transmission to the ATM. In some embodiments, even when the smart card is inserted into the ATM, transaction instructions may be transferred to the ATM using a wireless communication channel.

In some embodiments, the smart card may capture authentication information. The smart card may encrypt the authentication information and store the authentication information locally on the smart card. The smart card may transfer the authentication information to the ATM. After receiving the authentication information, the ATM may not prompt the user for authentication information.

After the user inserts the smart card into the ATM, the smart card may interact directly with the ATM, without requiring any further authentication information from the user. The smart card may transfer the authentication information to the ATM in response to an authentication request submitted by the ATM directly to the smart card. The user may trigger the ATM to request the authentication information. For example, inserting the smart card into the ATM may trigger a request for authentication information. Actuating a button on the ATM may trigger a request for authentication information.

Transaction instructions may be formatted in a fashion that is understandable for processing by an ATM. The ATM may autonomously decrypt transaction instructions received from the smart card. The ATM may autonomously execute the transaction instructions and initiate a transaction (e.g., withdrawal) based on the transaction information (e.g., withdrawal amount and account) previously entered by the user. Transaction instructions formulated by the microprocessor may be sufficient to execute the transaction without the ATM prompting the user for additional data. The ATM may dispense the requested amount of cash to the user without requiring the user to enter any information at the ATM after inserting the smart card into the ATM.

The smart card may encrypt data entered by the user. The ATM may decrypt data it receives from the smart card. The smart card may encrypt all data entered by the user via the keypad. The smart card may encrypt less than all of the data associated with a set of transaction instructions. For example, the smart card may only encrypt a PIN or other authentication information.

Limiting the amount of data encrypted by the smart card may allow the smart card to use less power to function. Using less power may improve the functionality of the smart card by extending its battery life and extending the amount of time between charging.

Limiting the amount of data encrypted by the smart card may improve functionality of the ATM. The ATM may only need to decrypt selected data and not an entire set of transaction instructions. This may speed up a response time of the ATM when processing transactions instructions received from eh smart card. Limiting the amount of data that needs to be decrypted by the ATM may further increase the transaction processing efficiency of the ATM per unit of time.

The microprocessor may be configured to delete data from the smart card after expiration of a pre-determined time period. For example, the microprocessor may be configured to delete transaction instructions or authentication information stored on the smart card after expiration of a predetermined time period.

The keypad of the smart card may have an inactive state. In the inactive state, the keypad may not capture data entered using the keypad. For example, in the inactive state, the microprocessor may not supply power to the keypad. In the inactive state, the microprocessor may not capture data entered using the keypad.

The keypad may have an active state. In the active state, the keypad may be capable of capturing data entered by a user. In the active state, the microprocessor may supply power to the keypad. In the active state, the microprocessor may capture and/or encrypt data entered by the user using the keypad.

The inactive state of the keypad may be a default state. When the keypad is in the inactive state, data entered using the keypad of the smart card is not captured by the microprocessor. The microprocessor may toggle the keypad between the inactive and active states. For example, the microprocessor may activate the keypad in response to establishing a communication channel with an ATM.

A system for increasing transaction processing efficiency of an Automated Teller Machine ("ATM") is provided. The system may include a smart card having a thickness not greater than 0.8 mm. The smart card may have a width not greater than 54 mm. The smart card may have a length not greater 86 mm.

The system may include a communication interface. The communication interface may be embedded in the smart card. The communication interface may include hardware and software for communicating with an ATM. For example, the smart card may include circuitry for communicating over Wi-Fi, NFC, Bluetooth, cellular, satellite or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducting using the communication interface. For example, the microprocessor may initiate communication with an ATM using the communication interface. The microprocessor may terminate communication with the ATM by turning off the communication interface. Turning off the communication interface may include disconnecting from the ATM. Turning off the communication interface may include terminating communication channel with the ATM. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture voice commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the ATM. The executable instructions, when run by the microprocessor, may self-authenticate a user or the smart card. The self-authentication may be conducted over a communication channel established using the communication interface. The communication channel may be a secure communication linking the smart card and the ATM.

The executable instructions, when run by the microprocessor on the smart card may formulate transaction instructions executable by the ATM. The transaction instructions may be formulated based on the data stored on the smart card. Transaction instructions may be formulated before a secure communication channel is established between the smart card and the ATM. For example, a user of the smart card may enter data using the keypad when the user is at home. While at home, the smart card may not be within a communication range of an ATM.

Formulated transaction instructions may be transferred to an ATM over a secure communication channel linking the smart card and the ATM. An ATM may only establish a secure communication link with the smart card when the smart card is within a threshold distance of the ATM. When the smart card is within the threshold distance, the smart card may be likely or expected to access the ATM. In some embodiments, the secure communication link may only be established when the user initiates a request to establish the secure communication link.

Transaction information or instructions stored locally on the smart card may be used to stage a transaction at the ATM. A staged transaction may include all data needed to execute a transaction at the ATM without requiring further input from a user. For example, for a withdrawal transaction, the transaction instructions may include transaction/authentication information such as a PIN, the amount to be withdrawn and the account funds are to be withdrawn from.

When the ATM receives the transaction instructions, the ATM may verify that the PIN is associated with the account. The ATM may also verify that the account includes sufficient funds to fulfill the withdrawal request. After conducting the verification, the ATM may execute the transaction instructions. The user of the smart card may not need to input any additional information after the transaction information/instructions are transferred to the ATM.

In some embodiments, after conducting the verification of the PIN and sufficient funds, the ATM may await confirmation from the user before executing the transaction. For example, the ATM may receive the transaction instructions over a wireless communication channel. The ATM may receive transaction instructions over the wireless communication when the smart card is outside a threshold distance from the ATM. The user of the smart card may enter data used to formulate the transaction instructions when the user is at home or at work. The transaction instructions may be transmitted to the ATM over a Wi-Fi or cellular communication channel.

Transaction instructions may be transmitted from the smart card to a target ATM. The transaction instructions may be transmitted to a cloud computer system. When the smart card establishes a wired or wireless connection to the ATM, the ATM may check whether transaction instructions associated with the smart card are stored on the ATM or in the cloud computing system.

In some embodiments, after storing transaction instructions locally on the smart card, a flag may be set on the smart card. The ATM may be configured to check the flag and determine whether transaction instructions have been formulated by the smart card.

In some embodiments, the ATM may require authentication before establishing a connection with the smart card. For example, the ATM may require entry of the PIN or submission of a biometric feature before executing transaction instructions received from the smart card. Executing transaction instructions received from the smart card may reduce the number of user inputs required at the ATM. Reducing the number of user inputs at the ATM improves the transaction processing efficiency of the ATM.

The microprocessor may configure the smart card to purge transaction instructions when an ATM does not establish a wired or contact-based communication channel with the smart card within a pre-determined time period. A cloud computing system may receive transaction instructions at a first time. When an ATM accessible to the cloud computing system does not establish a connection to the smart card by a second time, the cloud computing system may purge the received transaction instructions.

In some embodiments, the interval between the first and second times may be set by the cloud computing system. The cloud computing system may assign a default interval to transaction instructions received from the smart card. The cloud computing system may assign a longer or shorter time interval based on a distance between a current location of the smart card transmitting the transaction instructions and a location of an ATM. The system may use a machine leaning algorithm to determine an interval that provides sufficient time for the smart card user to travel to and access the ATM.

The machine learning algorithm may take account of traffic patterns, time of day and typical user behavior. For example, if transaction instructions are received closer to the end of a workday, the interval may be shorter than if the transactions instructions are received earlier in the workday.

The system may include a front controller. The front controller may be included in the ATM. Using an ATM communication channel, the front controller may receive encrypted input data from the smart card via the communication interface. The encrypted data may include transaction instructions. Transaction instructions may be received by the front controller from a cloud computing system.

The system may include a decryption controller. The decryption controller may be included in the ATM. The decryption controller may decrypt encrypted data received by the ATM from the smart card.

The system may include an input validation controller. The input validation controller may communicate with a remote computer server. The remote computer serer may be a cloud computing system. The remote computer server may validate encrypted data received from the smart card. Validating the encrypted data may include verifying whether transaction instructions received from the smart card are associated with a valid PIN or other valid authentication information. Validating the encrypted data may include verifying whether transaction instructions are associated with sufficient funds for a specified transaction or account.

The system may include a payment dispatcher. The payment dispatcher may be included in the ATM. The payment dispatcher may dispense cash or other items in response to a positive validation received from the input validation controller.

The smart card may include a wireless communication interface. The microprocessor may instruct the wireless communication interface to scan for a wireless ATM communication channel. A wireless ATM communication channel may only be detectable when the smart card is within a threshold distance of an ATM. For example, the ATM wireless communication channel may be purposefully configured to have a maximum transmission range that is limited to a threshold distance from the ATM. An illustrative distance may a maximum NFC communication range.

In response to detecting the wireless ATM communication channel, the smart card may transfer transaction instructions to the ATM over the wireless ATM communication channel. The ATM may pre-stage a transaction based on received encrypted transaction instructions. The ATM may execute the pre-staged transaction only after establishing contact-based communication with the smart card.

The microprocessor may purge encrypted data stored on the smart card when contact-based communication with the ATM is not established within a pre-determined time period. The ATM may purge transaction instructions received from the smart card when contact-based communication is not established with the smart card within a pre-determined time period.

Apparatus for a smart card that improves transaction processing efficiency of an ATM or other self-service kiosk is provided. The smart card may include a housing that defines a form factor of the smart card. The smart card may include hardware components such as a communication interface, a microprocessor and a battery.

The smart card may include a stylus. The stylus may be configured to be seated within, and removable from, the housing. The stylus, when seated within the housing may form a protrusion, depression or other geometric feature in the housing. The geometric feature may be a key that directs insertion of the smart card into a card reader of an ATM or other self-service kiosk. A kiosk may include a corresponding geometric feature configured to limit an orientation of the smart card when being inserted into the kiosk. The corresponding geometric features of the smart card and kiosk may ensure that a smart card is inserted into the kiosk in a desired orientation. A desired orientation may include ensuring that a smart card is inserted into a card reader such that an EMV chip of the smart card may be read by the kiosk.

The smart card may include a touch-sensitive surface. The touch-sensitive surface may capture motion of the stylus against the touch-sensitive surface. The smart card may include specialized software (executable by the microprocessor) for automatic conversion of captured motions as they are input by the user on the touch-sensitive surface.

The touch-sensitive surface may utilize resistive touch technology to detect stylus touch points. Touch-sensitive surfaces constructed using resistive touch technology include an upper layer (which is touched by the stylus) spaced apart from a bottom layer. When the stylus contacts the touch-sensitive surface, the upper layer contacts the bottom layer, generating an electrical signal. A touch-sensitive surface constructed using resistive touch technology only requires application of pressure to register an input and does not require application of heat or electrical charge to detect a touch input. Resistive-touch technology is also relatively less expensive than other touch sensing technologies.

The touch-sensitive surface may utilize capacitive touch technology to detect inputs. A touch-sensitive surface constructed using capacitive touch technology may identify where a stylus contacts the surface based on detecting an electrical disturbance created when the stylus contacts the screen. The tip of the stylus may include electrical conducting material. Contact of the stylus tip with another conducting surface, such as the touch-sensitive surface, may generates a detectable electrical disturbance. Capacitive touch technology detects the electrical disturbance and determines a location on the surface contacted by the stylus.

The touch-sensitive surface may utilize any suitable touch detection technology such as surface acoustic wave, optical imaging, infrared acrylic projection or acoustic pulse recognition technologies.

The smart card may include a touch-sensing controller for detecting a touched surface location. The touch-sensing controller may include an application-specific integrated circuit (ASIC) chip and a digital signal processor (DSP) chip.

In some embodiments, the touch-sensitive surface may provide "single-touch" functionality. Single-touch functionality may detect input from one touch point on the touch-sensitive surface. For example, the touch-sensitive surface may display a list of options and the user may select one of the option by using the stylus to touch the desired option. Single-touch functionality may also recognize double taps or a long-press functionality.

In some embodiments, the touch-sensitive surface may provide "multi-touch" functionality. Multi-touch functionality may detect input from two or more simultaneous touch points applied to the touch-sensitive surface. For example, pinch-to-zoom is a multi-touch functionality.

The touch-sensitive surface may include organic light emitting diode ("OLED") technology. A touch-sensitive surface constructed using OLED technology may have a thickness that is not greater than 0.25 mm. OLEDs may be flexible. The microprocessor may configure a touch-sensitive surface constructed using OLEDs to display information.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment. Furthermore, OLEDs may be used to construct a display that consumes less power compared to other display technologies.

The smart card may include a haptic response system. The haptic response system may provide a responsive force, vibration or movement in response to receiving a touch input. For the example, the haptic response system may provide a responsive vibration to a touch-based selection of a displayed option. The haptic response system may include an eccentric (unbalanced) rotating mass, a linear resonant actuator, a piezoelectric actuator or any other suitable hardware for providing haptic responses.

The microprocessor and associated hardware may interpret finger or stylus motion applied to the touch-sensitive surface. For example, the microprocessor may translate the finger or stylus motion into digital transaction information. The microprocessor may translate the finger or stylus motions into digital transaction instructions. The microprocessor may encrypt the captured motions.

The microprocessor may save captured finger or stylus motion locally on the smart card. The microprocessor may translate the captured motion into transaction information or instructions. The motion of the stylus, as translated by the microprocessor may be presented on the touch-sensitive surface.

For example, the microprocessor may translate the captured motion into entry of PIN. The microprocessor may translate the captured motion into entry of an amount of cash desired to be withdrawn from an ATM. The microprocessor may translate the captured motion into entry of an account the user desires to withdraw the cash from. The microprocessor may generate at least two transaction options based on captured stylus motion. The microprocessor may present the generated transaction options for selection on the touch-sensitive surface.

The microprocessor may formulate a set of transaction instructions executable by an ATM or other kiosk based on captured stylus motion. The microprocessor may formulate transaction instructions executable by the ATM based on a user's touch-based selection of transaction options displayed on the touch-sensitive surface. The user may provide touch-based confirmation of the accuracy of transaction instructions formulated by the microprocessor.

The microprocessor may encrypt the transaction instructions. In response to establishing a communication channel with an ATM or other kiosk, the microprocessor, using the wireless interface, may trigger autonomous execution of a transaction at the kiosk by transferring transaction instructions from the smart card to the kiosk. The transaction instructions, when received by a kiosk, may autonomously initiate a transaction at the kiosk.

Triggering autonomous execution of a transaction may refer to initiating a transaction at a kiosk based on receiving transaction instructions from the smart card without the kiosk prompting for, or waiting to receive, any additional input data from a user. Triggering autonomous execution of a transaction may therefore improve the transaction processing efficiency of the kiosk by reducing delays associated with the kiosk prompting for and, waiting to receive responses to, additional data inputs such as transaction or authentication information.

In response to establishing a communication channel with an ATM, using the communication interface, the microprocessor may transfer formulated transaction instructions to an ATM or other kiosk. The communication interface may include a wireless communication circuit. The microprocessor may initiate a transaction at a kiosk in response to establishing a wireless communication channel with the kiosk.

The microprocessor may trigger autonomous execution of a transaction at the kiosk by transferring transaction instructions to the kiosk over the wireless communication channel. The microprocessor may capture and translate stylus motion at a first location. The microprocessor may trigger execution of a transaction, based on the captured motion, at a second location. The smart card may transfer the transaction instructions to the second location using the communication channel.

The microprocessor may require a touch-based confirmation from the user before transmitting transaction instructions to a kiosk. The microprocessor may display a confirmatory message on the touch-sensitive surface and require the user to register confirmation by touching (e.g., using a stylus) a target area of the surface. For example, the target area may include a check box displayed adjacent to the confirmatory message. The user may touch the check box to register confirmation of a displayed message.

In some embodiments, the smart card may include a fingerprint reader embedded within, or underneath the touch-sensitive surface. The user may register confirmation of transaction instructions by submitting a fingerprint using the embedded fingerprint reader. The microprocessor may confirm transaction instructions by determining whether the fingerprint by the user provided matches a known fingerprint securely stored locally on the smart card.

In some embodiments, the microprocessor may display the target area associated with a confirmatory message overlaid above the embedded fingerprint reader. By pressing a finger against the target area, the microprocessor may register confirmation of the transaction instructions by registering the user's touch confirmation in the target area and simultaneously submit a fingerprint for verification. The transaction may only be executed when the microprocessor successfully registers the user's touch confirmation and validates the submitted fingerprint.

In some embodiments, the smart card may include an electrical contact. The microprocessor may only transfer transaction instructions to the kiosk and thereby initiate a transaction at the kiosk in response to establishing a contact-based communication channel with the kiosk. Establishing a contact-based communication channel with the kiosk may ensure the user and smart card is physically present at the kiosk. Establishing a contact-based communication channel with the kiosk may ensure the user is currently accessing the kiosk. A battery of the smart card may be recharged via the at least one electrical contact when the smart card is in contact-based communication with the kiosk.

The touch-sensitive surface may have an inactive state. In the inactive state, the touch-sensitive surface may be unable to capture data such as stylus touch inputs. When the touch-sensitive surface is in the inactive state, stylus touch inputs applied to the touch-sensitive surface are not captured by the microprocessor.

The touch-sensitive surface may have an active state. In the active state, the touch-sensitive surface is capable of capturing data, such as a user's touch inputs. The inactive state may be a default state of the touch-sensitive surface. A default inactive state may avoid the microprocessor capturing inadvertent or unintentional touch inputs.

The microprocessor may toggle the touch-sensitive surface from the inactive state to the active state. The microprocessor may toggle the touch-sensitive surface from the active state to the inactive state. For example, the microprocessor may toggle the touch-sensitive surface from the inactive state to the active state in response to establishing a communication channel with a kiosk. The microprocessor may toggle the touch-sensitive surface from the inactive state to the active state in response to determining that the communication interface is within a communication range of a kiosk.

In some embodiments, a smart card may include a touch-sensitive surface and a keypad. The keypad may be a mechanical keypad. In such embodiments, the housing and the keypad collectively may have a thickness that is not greater than 0.8 mm. In some embodiments, the smart card may only include a touch-sensitive surface. The touch-sensitive surface may be configured to display a virtual keypad. The virtual keypad may include a display of input buttons that may be touch-selected by the user. In such embodiments, the housing and the touch-sensitive surface collectively may have a thickness that is not greater than 0.8 mm.

The smart card may include a voice controller. The voice controller may generate an audio message confirming the microprocessor's interpretation of the touch inputs (e.g., stylus motion) applied to the touch-sensitive surface and captured by the input controller. The microprocessor may prompt the user to touch a target area of the screen to confirm an accuracy of the generated audio message. In response to receiving the user's confirmation, the microprocessor may generate transaction instructions for executing the transaction identified in the audio message and confirmed by the user.

The smart card may include an encryption controller. The encryption controller may encrypt data captured by the input controller. The encryption controller may encrypt the transaction instructions formulated by the microprocessor.

The microprocessor may self-authenticate the smart card to an ATM or other self-service kiosk. Self-authentication may include providing a kiosk with authentication credentials stored locally on the smart card. The self-authentication process may not prompt the user or require any inputs from the user. Authentication credentials may include a PIN or a biometric feature. The authentication credentials may be provided by the user during a process of entering transaction or authentication information.

In some embodiments, the user may be required to enter authentication credentials each time transaction information is entered into the smart card. In some embodiments, the smart card may only require the user to enter authentication credentials after expiration of a pre-determined time period. The kiosk may be configured to verify authentication credentials provided by the smart card before executing transaction instructions received from the smart card. The kiosk may communication with a remote computer system to verify authentication credentials or information included in transaction instructions received from the smart card.

A system for improving transaction processing efficiency of an ATM or other self-service kiosk is provided. The system may include a smart card having a thickness not greater than 0.8 mm and a surface area not greater than 86 mm×54 mm. The smart card may include a communication interface and a microprocessor. The smart card may include a user input system in electronic communication with the microprocessor.

The user input system may include a stylus and a touch-sensitive surface. The touch-sensitive surface may capture motion of the stylus against or applied to the touch-sensitive screen. The user input system may include an input controller. The input controller may decipher captured motion of the stylus. The input controller may formulate transaction instructions based on the deciphered motion.

The user input system may include an encryption controller. The encryption controller may encrypt the formulated transaction instructions.

The smart card may include a non-transitory memory that stores executable instructions, such as software or firmware. The executable instructions, when run by the microprocessor, may implement various functions of the smart card. For example, the microprocessor may self-authenticate the smart card to an ATM over a communication channel and establish a secure communication link with the ATM using the communication interface. The microprocessor may trigger execution of a transaction at the ATM by transferring transaction instructions to the ATM, thereby improving the transaction processing efficiency of the ATM.

A surface area of the smart card may define a front face and a back face. The touch-sensitive surface may include a first writing surface on the front face. The touch-sensitive surface may include a second writing surface on the back face.

The smart card may include a receptacle for the stylus. The receptacle may be defined within a thickness of the smart card. The stylus may be constructed so that it may be seated within receptacle. The receptable and the stylus, even when seated in the receptable, may not increase the thickness of the smart card.

In some embodiments, the stylus, when seated in the receptacle, may form a key. The key may be a geometric feature. The geometric feature may protrude from a face of the smart card. The geometric feature may form a depression in a face of the smart card. The key may be configured to mate with a corresponding keyway defined by a card reader of an ATM. The key and keyway may limit an orientation of the smart card when inserted into the card reader. The key and keyway may only allow a smart card to be inserted into the ATM when the key mates with the keyway. For example, the key and keyway may be positioned such that the smart card can only be oriented into the card reader in an orientation that allows the card reader to establish a contact-based communication channel with an electrical contact of the smart card.

The smart card may include a voice controller. The voice controller may generate an audio message confirming transaction or authentication information entered by the user. The voice controller may generate an audio message confirming an interpretation (by the microcontroller or input controller) of stylus motion applied by the user to the touch-sensitive surface. The voice controller may generate an audio message confirming transaction instructions formulated by the input controller. The microprocessor may require the user to register confirmation of the audio message by touching a target area of the touch-sensitive surface.

Methods for improving transaction processing efficiency of an ATM, or other self-service kiosks are provided. Methods may include capturing motion of a stylus when moved or pressed against a touch-sensitive surface of the smart card. Methods may include formulating transaction instructions based on the captured stylus motion. Methods may include encrypting the transaction instructions.

Methods may include storing transaction instructions locally on the smart card. Methods may include transferring transaction instructions from the smart card to a kiosk. The transfer may trigger execution of a transaction at the kiosk without requiring any input from a user of the smart card after the kiosk receives the transaction instructions.

Methods may include capturing stylus motion at a first location and at a first time. The first location may be a user's home or other location within a familiar zone. Methods may include transferring the transaction instructions to the kiosk at a second location and at a second time. For example, the transaction instructions entered by the user at home, may be transferred to an ATM after the user leaves work for the day.

Methods may include capturing first motions of the stylus from a first touch-sensitive surface on a front face of the smart card. Methods may include capturing second motions of the stylus from a second touch-sensitive surface on a back face of the smart card. Methods may include formulating transaction instructions based on the first and second motions. The first and second touch-sensitive surfaces may provide, collectively, a larger surface area for a user to input transaction information via stylus motions. The microprocessor may collectively interpret user input provided on the first and second touch-sensitive surfaces. The microprocessor may generate transaction instructions based on interpreting the collective user inputs.

Methods for improving transaction processing efficiency of an ATM or other self-service kiosk are provided. Methods may include capturing transaction information using a keypad embedded in a smart card. Methods may include formulating transaction instructions based on the transaction information captured via the keypad.

Methods may include encrypting the transaction information. Methods may include storing the encrypted transaction information locally on the smart card. Methods may include encrypting the transaction instructions. Methods may include storing the encrypted transaction instructions locally on the smart card.

Methods may include transferring the encrypted transaction instructions from the smart card to an ATM. Methods may include formulating a staged transaction at the ATM based on the encrypted transaction information. The staged transaction may include transaction and authentication information needed for the ATM to execute a transaction autonomously, without requiring additional user input. Methods may include executing the staged transaction without receiving any input from a user of the smart card after transferring the transaction instructions from the smart card to the ATM.

In some embodiments, the smart card may encrypt transaction information entered by a user. Methods may include providing audio confirmation to the user of the smart card. The audio confirmation may provide an audible articulation of the transaction information or instructions stored locally on the smart card.

Methods may include transferring information such, such as transaction instructions, from the smart card to the ATM using a contact-based communication channel. Methods may include transferring information from the smart card to the ATM using a wireless communication channel. In some embodiments, the smart card may transmit transaction or authentication information to the ATM. The ATM may formulate transaction instructions based on the received transaction and authentication information. The ATM may execute a transaction on behalf of the smart card user using transaction instructions formulated based on information received from the smart card.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes touch-sensitive surface 105. Smart card 100 includes stylus 103. A user may touch surface 105 with stylus 103 to select and input transaction information displayed by touch-sensitive surface 105.

Smart card 100 includes receptacle 111. Receptacle 111 may define, within a thickness of smart card 100, a space for holding stylus 103. Stylus 103 may be configured to be seated within receptacle 111 such that stylus 103 does not increase the thickness of smart card 100. FIG. 1 shows that receptacle 111 is oriented along a length of smart card 100.

Stylus 103 may be configured to be seated within receptacle 111 such that stylus 103 does not increase a length of smart card 100.

A user may move stylus 103 across touch-sensitive surface 105 to input data such as transaction or authentication information. A user may use finger motions, applied against touch-sensitive surface 105, to enter transaction information. A microprocessor of smart card 100 may interpret stylus or finger motions applied to touch-sensitive surface 105. The microprocessor may interpret a user's handwritten instructions and detect touch based inputs.

that includes an amount of cash the user wishes to withdraw from an ATM. Hand-written information shown on touch-sensitive surface 105 also includes a source account the user wishes to withdraw cash from.

Other illustrative information that may be entered by a user using touch inputs applied to touch-sensitive surface 105 may include a time or a time window when the user would like to withdraw the cash from the ATM.

FIG. 1 shows a user has hand-written information on touch-sensitive surface 105. FIG. shows that using stylus 103 a user has handwritten "W/D $100 Account 1234 1530-1430" on touch-sensitive surface 105. The microcontroller may interpret this handwritten information to represent transaction information requesting that the user wishes to withdraw $100 from an account having a number ending in 1234.

FIG. 1 shows that the user has entered "$" to denominate a currency of the funds. In other embodiments, a currency of the funds may be automatically assigned based on a current location of the ATM. FIG. 1 shows that touch-sensitive surface 105 may display virtual currency keys 107 that may be touched to select a currency of the desired funds. Illustrative currency keys 107 include appropriate symbols for dollars ($), euros (€), yen (¥), pounds (£). Any suitable currency keys may be displayed.

The microprocessor may interpret the handwritten entry of "1430-1530" as a timing restriction associated with the entered transaction instructions. The microprocessor may interpret the handwritten entry of "1430-1530" to represent that the user wishes to withdraw the $100 between 2:30 pm ("1430") and 3:30 pm ("1530"). An ATM may not allow withdrawal of $100 before 2:30 μm. The ATM may not allow execution of the staged withdrawal of $100 after 3:30 pm.

In some embodiments, the user may only indicate "1430." When the user specifies "1430", an ATM may not allow withdrawal of the $100 before 2:30 pm. In some embodiments, the user may not specify any timing restrictions. Not specifying a time may indicate that user wishes to withdraw the funds at any time.

Based on the entered time restrictions, smart card 100 may purge the entered transaction information after 3:30 pm. Smart card 100 may not transfer the transaction information or instructions to an ATM before 2:30 pm or after 3:30 pm. Smart card 100 may also purge transaction information or instructions after they have been transferred to an ATM.

FIG. 1 shows that smart card 100 includes chip 101. Chip 101 may provide an electrical contact that is accessible through housing 102. Chip 101 may provide an electrical contact for establishing a wired or contact based communication channel with an ATM when card 100 is inserted into a card reader of the ATM. Chip 101 may be an EMV chip.

Chip 101 may store a copy of information printed on a face of smart card 100. For example, chip 101 may store card number 109, username 115, expiration date 113 and identify an issuing bank associated with smart card 100. Chip 101 may also store encrypted authentication information. The encrypted authentication information may be utilized to provide a "second factor" method of authentication prior to executing a staged transaction.

For example, smart card 100 may package information "W/D $100 Account 1234 1430-1530" entered by a user via touch-sensitive surface 105 into transaction instructions. The transaction instructions may include a PIN associated with smart card 100. The transaction instructions may be executable by an ATM without requiring any further input from the user. The staged transaction instructions may be transferred to the ATM using a communication interface of smart card 100. In some embodiments, the transaction instructions may be transferred via a contact-based connection established using chip 101.

After an ATM receives transaction instructions from smart card 100, the ATM may first determine whether the PIN included in the transaction instructions is associated with smart card 100. For example, the ATM may communicate with a remote server and determine whether the received PIN is associated with username 115 and/or card number 109.

As a second factor method of authentication, the ATM may determine whether the PIN included in the transaction instructions (and transferred to the ATM) successfully unlocks encrypted authentication information stored on chip 101. If the PIN successfully unlocks the encrypted authentication information, the ATM may autonomously execute the received transaction instructions.

Figure 2:
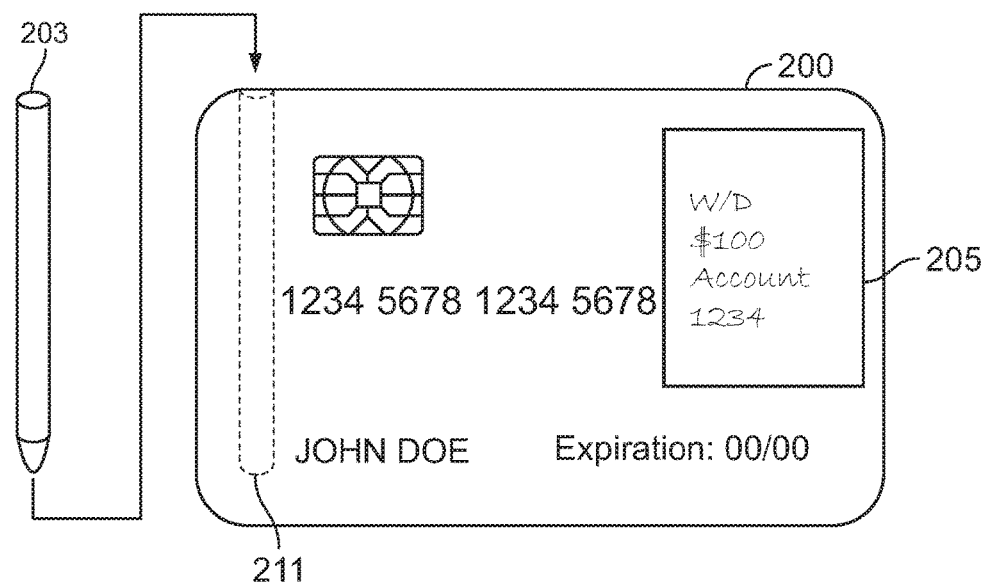
FIG. 2 shows illustrative apparatus in accordance with principles of the disclosure.

FIG. 2 shows illustrative smart card 200. Smart card 200 may include one or more features of smart card 100. Smart card includes stylus 203. Stylus 203 may include one or more features of stylus 103. Smart card includes touch-sensitive surface 205. Touch-sensitive surface 205 may include one or more features of touch-sensitive surface 105.

Smart card 200 includes receptacle 211. Receptacle 211 may define, within a thickness of smart card 200, a space for holding stylus 203. Stylus 203 may be configured to be seated within receptacle 211 such that stylus 203 does not increase a thickness of smart card 200. FIG. 2 shows that receptacle 211 is oriented along a width of smart card 200. Stylus 203 may be configured to be seated within receptacle 211 such that stylus 103 does not increase the width of smart card 200.

Figure 3:
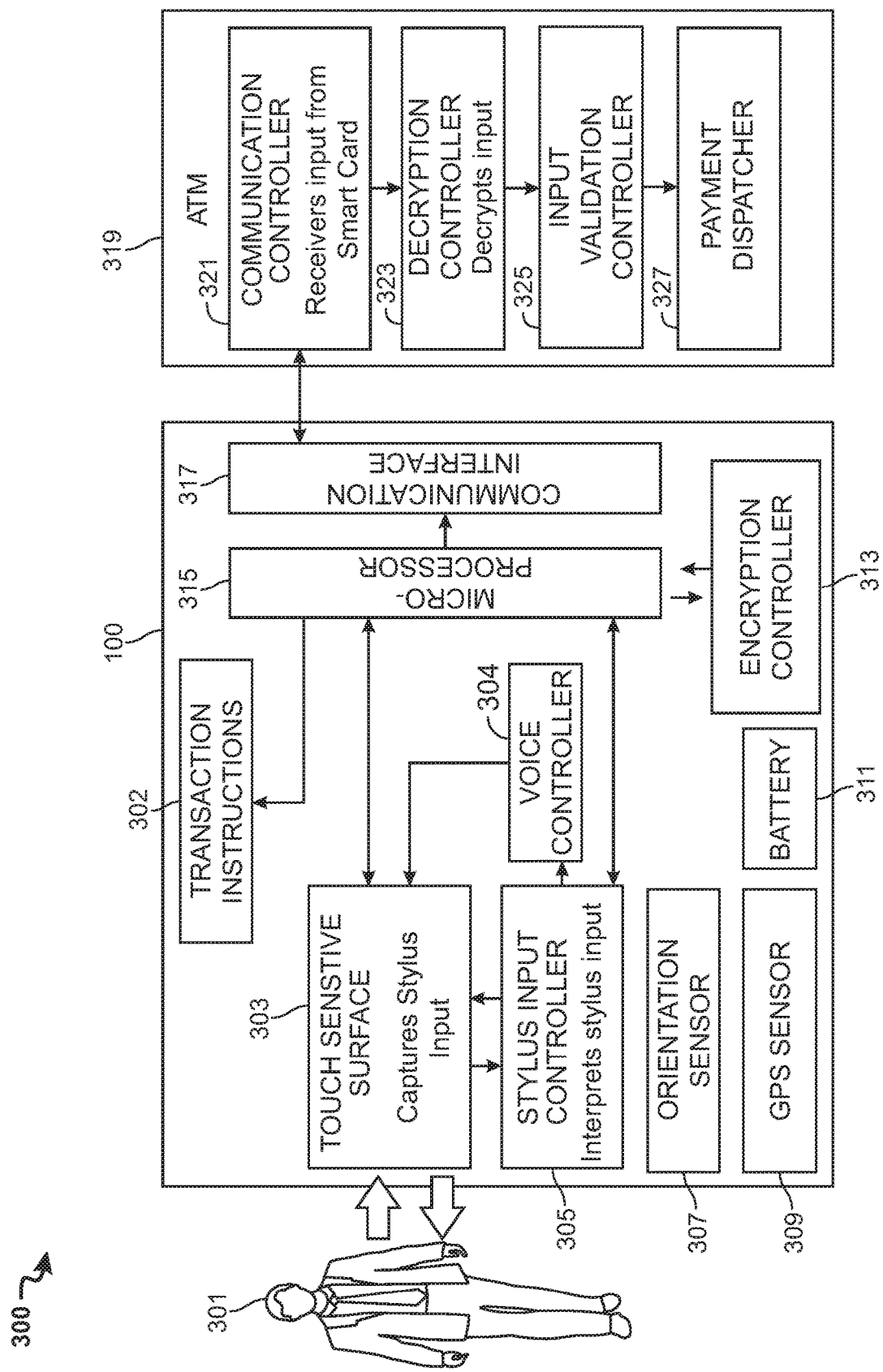
FIG. 3 shows an illustrative apparatus and process in accordance with principles of the disclosure.

FIG. 3 shows illustrative components 300 of smart card 100 (shown in FIG. 1) and ATM 200 (shown in FIG. 2).

FIG. 3 shows that smart card 100 includes touch-sensitive surface 303. Smart card 100 may include a speaker (not shown) for receiving input and providing output to user 301. The speaker may be controller by voice controller 304. Voice controller 304 may receive instructions from stylus input controller 305.

Stylus input controller 305 may capture touch inputs provided by user 301 using touch-sensitive surface 303. Stylus input controller 305 may encrypt the captured data. Stylus input controller 305 may store captured data locally on smart card 100. Voice controller 304 may generate electrical impulses that when received by the speaker, audibly convey to user 301 an interpretation of touch inputs captured by stylus input controller 305.

Encryption of data captured by stylus input controller 305 may be performed by encryption controller 313. Encryption controller 313 may encrypt data using any suitable encryption algorithm. Illustrative encryption algorithms include RSA cryptography, Blowfish, AES, RC4, RC5, and RC6. Smart card 100 may have limited power resources and may utilize an energy efficient encryption algorithm. An energy efficient encryption algorithm may improve the functionality of the smart card by extending the amount of time between a charging of battery 311.

An illustrative energy efficient encryption algorithm may include RC5, Skipjack and Secure IoT ("SIT"). SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are symmetric and therefore more efficient. The reduced number of encryption rounds is offset by the relatively long 64 bit key.

Microprocessor 315 may control overall operation of smart card 100 and its associated components. For example, microprocessor 315 may activate or deactivate touch-sensitive surface 303. When touch-sensitive surface 303 is active, stylus input controller 305 may capture and encrypt touch inputs. When touch-sensitive surface 303 is inactive, stylus input controller 305 may not receive touch data from touch-sensitive surface 303. For example, in the inactive state, power may not be supplied to touch-sensitive surface 303.

Microprocessor 315 may activate or deactivate stylus input controller 305. When active, stylus input controller 305 may capture and encrypt touch inputs received from touch-sensitive surface 303. When inactive, stylus input controller 305 may disregard touch inputs received from touch-sensitive surface 303.

Microprocessor 315 may activate or deactivate and otherwise control operation of any component of smart card 100. Microprocessor may run machine readable instructions that direct operation of microprocessor 315. For example, based on detecting a communication channel associated with ATM 319, microprocessor may activate one or more components of smart card 100.

Microprocessor 315 may activate or deactivate components of smart card 100 based on a location of smart card 100. For example, microprocessor 315 may only activate touch-sensitive surface 303 or stylus input controller 305 when smart card 100 is in a familiar zone. User 301 may define a familiar zone by inputting a zip code using received from touch-sensitive surface 303. Microprocessor 315 may deactivate touch-sensitive surface 303 or stylus input controller 305 when smart card 100 is in an unknown zone. Smart card 100 may include a GPS chip for detecting a current location.

Smart card 100 also includes communication interface 317. Communication interface 317 may include a network interface or adapter. Communication interface 317 may include hardware and/or software for establishing a communication channel with ATM 319. Communication interface 317 may be configured to implement protocols for wireless and/or wired communication with ATM 319.

Smart card 100 includes orientation sensor 307. Orientation sensor 307 may detect a position of smart card 307. For example, orientation sensor 307 may determine whether a front or back face of smart card 100 is facing user 301. Smart card 100 may only display information on the touch-sensitive surface facing user 301. Orientation sensor 307 may include an accelerometer that measures changes in motion of smart card 100. Orientation sensor 307 may include a gyroscope. A gyroscope may detect rotation of smart card 100.

Smart card 100 includes GPS sensor 309. GPS sensor may be utilized to determine a location of smart card 100. For example, based on a location of smart card 100, microprocessor 315 may determine whether smart card 100 is located in a familiar zone or an unknown zone.

FIG. 3 also shows illustrative components of ATM 319. ATM 319 includes communication controller 321. Communication controller 321 communicates with smart card 100 via communication interface 317.

Communication controller 321 may include a network interface or adapter. Communication controller 321 may include hardware and/or software for establishing a communication channel with smart card 100. Communication controller 321 may be configured to implement protocols for wireless and/or wired communication with smart card 100.

Communication controller 321 may receive transaction instructions 302 stored locally on smart card 100 via communication interface 317. Communication controller 321 may establish a wired or contact based connection with smart card 100. Communication controller 321 may establish a wireless connection with smart card 100. For example, communication controller 321 may include an NFC reader or a Wi-Fi antenna.

Communication controller 321 may include a card reader (not shown) for establishing a wired connection with smart card 100. The card reader may include circuitry for interacting with chip 101 (shown in FIG. 1) of smart card 100. For example, communication controller 321 may include one or more read heads. The read head(s) may include a plurality of sub-heads that are positioned to extract information encoded on chip 101. The sub-heads may be positioned based on target chip locations as defined in ISO 7816, which is hereby incorporated herein by reference in its entirety.

ATM 319 includes decryption controller 323. Decryption controller 323 may decrypt transaction instructions 302 received from smart card 100. The decrypted transaction instructions 302 may be passed to input validation controller 325. Input validation controller 325 may connect to a remote computer server to validate authentication or transaction information included in transaction instructions 302 received from smart card 100.

For example, input validation controller 325 may validate a PIN associated with user 301 and smart card 100. Input validation controller 325 may validate that an account associated with smart card 100 has an adequate balance to withdraw a requested amount included in transaction instructions 302.

After input validation controller 325 validates transaction instructions 302, input validation controller 325 may issue instructions to payment dispatcher 327. Payment dispatcher 327 may dispense the amount of cash requested by transaction instructions 302 (received from smart card 100) to user 301. ATM 319 does not require any input from user 301 after establishing communication with smart card 100 and receiving transaction instructions 302 stored on smart card 100.

Figure 4A:
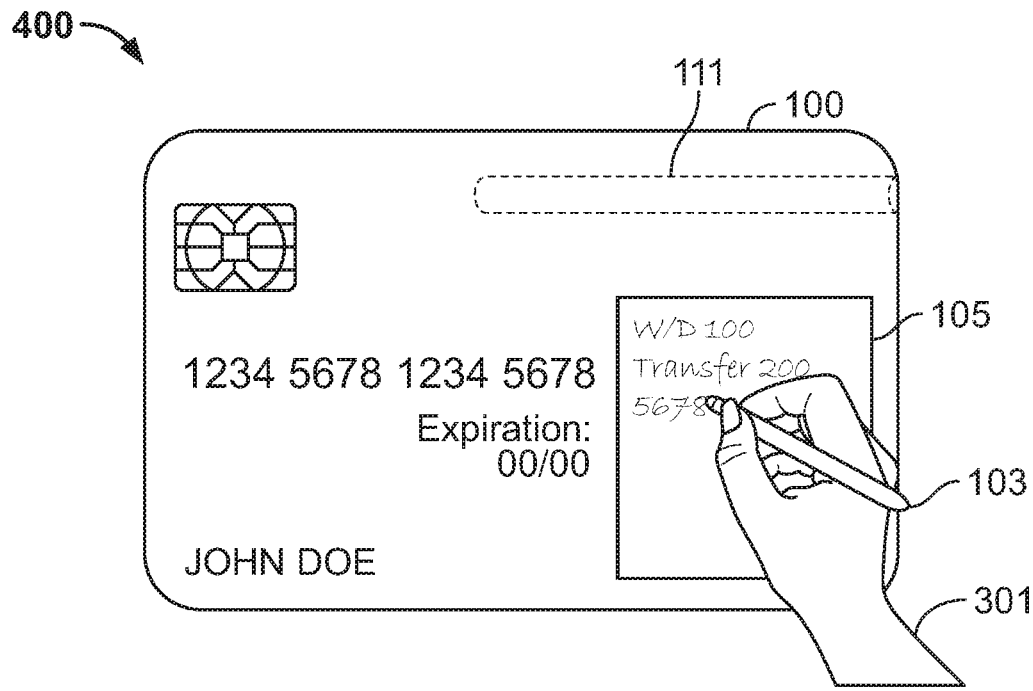
FIG. 4A shows an illustrative apparatus and scenario in accordance with principles of the disclosure.

FIG. 4A shows illustrative scenario 400. Scenario 400 shows that user 301 (shown in FIG. 3) has moved stylus 103 against touch-sensitive surface 105. Scenario 400 shows that user 301 has handwritten "W/D 100 Transfer 200 5678." The stylus motion of user 301 may be stored locally on smart card 100.

Figure 4B:
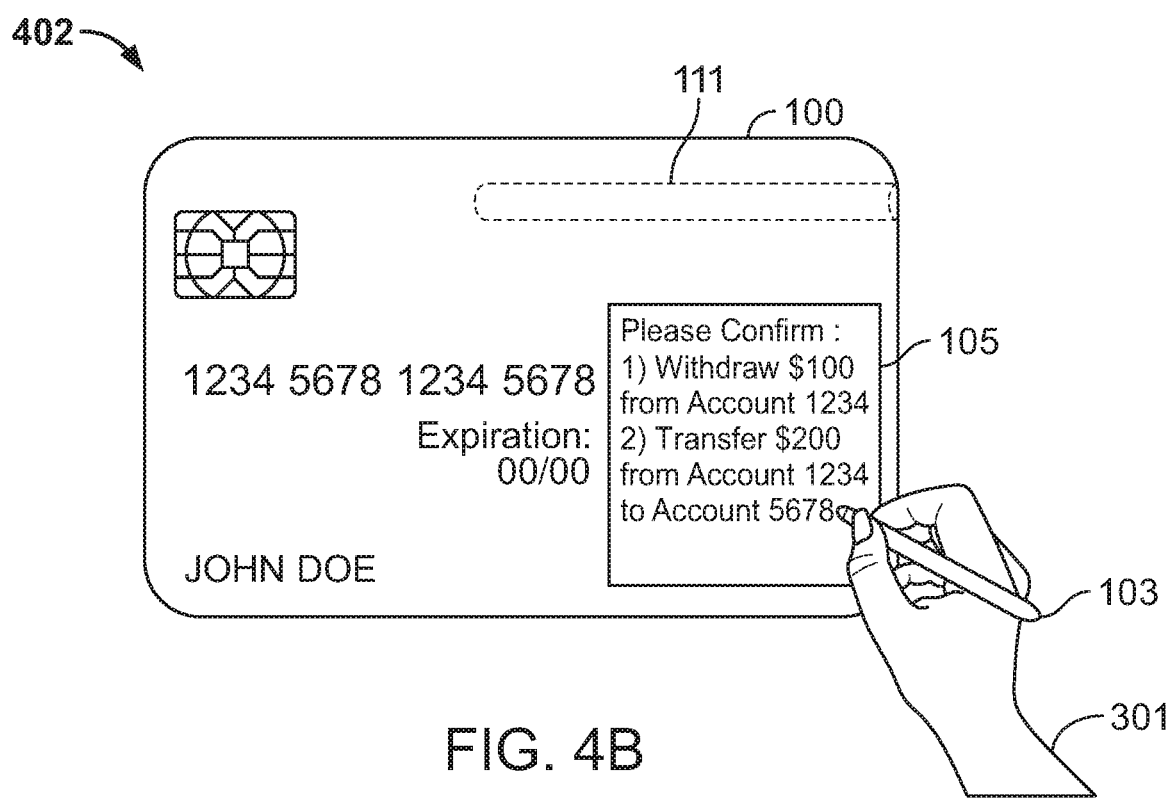
FIG. 4B shows an illustrative apparatus and scenario in accordance with principles of the disclosure.

FIG. 4B shows scenario 402. Scenario 402 shows that microprocessor 315 of smart card 100 has interpreted the stylus motion of user 301. Microprocessor 315 has determined that that the stylus motion corresponds to two distinct transactions: (1) a withdrawal transaction and an (2) account transfer.

For the withdrawal transaction, microprocessor 315 has determined that the requested withdrawal amount is $100. Although user 301 has not expressly entered a source account for the withdrawal, microprocessor 315 has suggested the account ending in "1234." The 1234 account may be a default account assigned by user 301 for withdrawal transactions. The 1234 account may be a default account assigned by microprocessor 315 for withdrawal transactions. Microprocessor 315 may determine a default account based on a transaction history of user 301.

For the transfer transaction, microprocessor 315 has determined that user 301 desires to transfer $200 from account 1234 to account 5678. Although user 301 has not expressly entered a source account for the transfer, microprocessor 315 has suggested the account ending in "1234." The 1234 account may be a default account assigned by user 301 for transfer transactions. For example, the 1234 account may be a checking account linked to smart card 100. The 1234 account may be a default account assigned by microprocessor 315 for transfer transactions. Microprocessor 315 may determine a default account based on a transaction history of user 301.

If user 301 would like to make changes to any of the presented transaction details generated by microprocessor 315, user 301 may touch the displayed transaction details with stylus 103. Touching displayed transaction detailed with stylus 103 may trigger display a menu or list of alternative available transaction options. For example, when user 301 touches destination account 5678 in the transfer transaction details (shown in scenario 402), a list of alternative destination accounts may be presented. User 301 may touch a displayed account with stylus 103 to select the desired destination account.

Figure 4C:
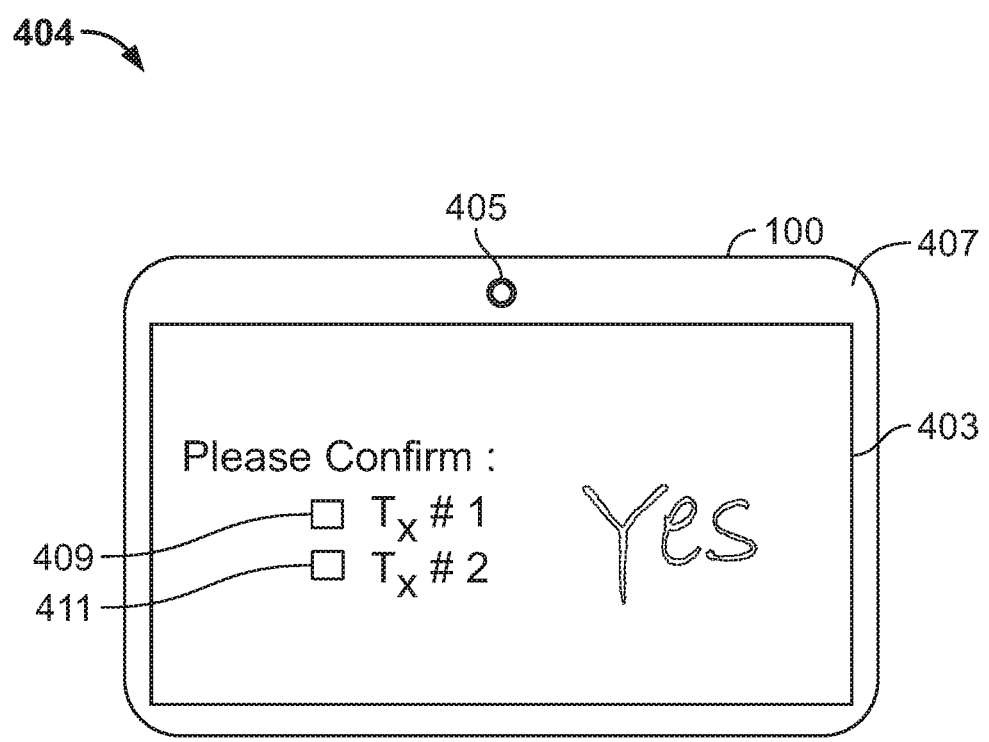
FIG. 4C shows an illustrative apparatus and scenario in accordance with principles of the disclosure.

FIG. 4C shows illustrative scenario 404. Scenario 404 shows that user 301 has turned over smart card 100 to access back face 407. Smart card 100 includes touch-sensitive surface 105 on a front face. Smart card 100 includes touch-sensitive surface 403 on back face 407. Scenario 404 shows touch-sensitive surface 403 displaying a message asking user 301 to confirm the two transactions presented by microprocessor 315 on touch-sensitive surface 105 in scenario 402 (shown in FIG. 4B).

To confirm transaction #1, user 301 may touch stylus 103 against target area 409. To confirm transaction #2, user 301 may touch stylus 103 against target area 411. Scenario 404 also shows that user 301 may use stylus 103 to write the word "Yes" on touch-sensitive surface 403. Writing the word "Yes" may confirm both transactions.

Smart card 100 includes camera 405. As part of a transaction information confirmation process, microprocessor 315 may require user 401 to provide a biometric feature. Camera 405 may capture the requested biometric feature. Illustrative biometric features may include facial, iris or retina scans. Microprocessor 315 may validate the captured biometric feature by comparing a digital signature of the captured biometric feature to a reference value stored on smart card 100.

After confirming transaction information, microprocessor 315 may formulate transaction instructions 302 (shown in FIG. 3). Transaction instructions 302 may be encrypted and stored locally on smart card 100. No external hardware or software such as a mobile device, laptop or desktop device is needed to formulate transaction instructions 302. Transaction instructions 302 may be transferred to ATM 319 (shown in FIG. 3). When ATM 319 receives transaction instructions 302, it may autonomously execute transactions #'s 1 and 2 displayed on touch-sensitive surface 105 in scenario 402.

Figure 5A:
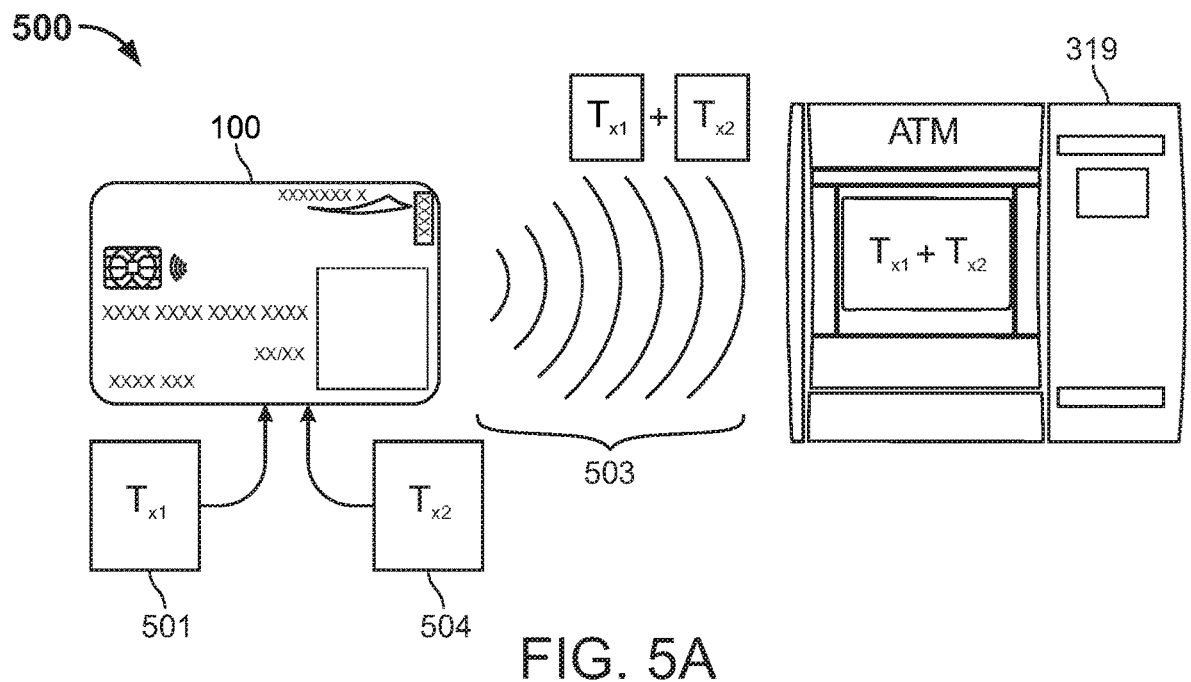
FIG. 5A shows an illustrative apparatus and process in accordance with principles of the disclosure.
Figure 5B:
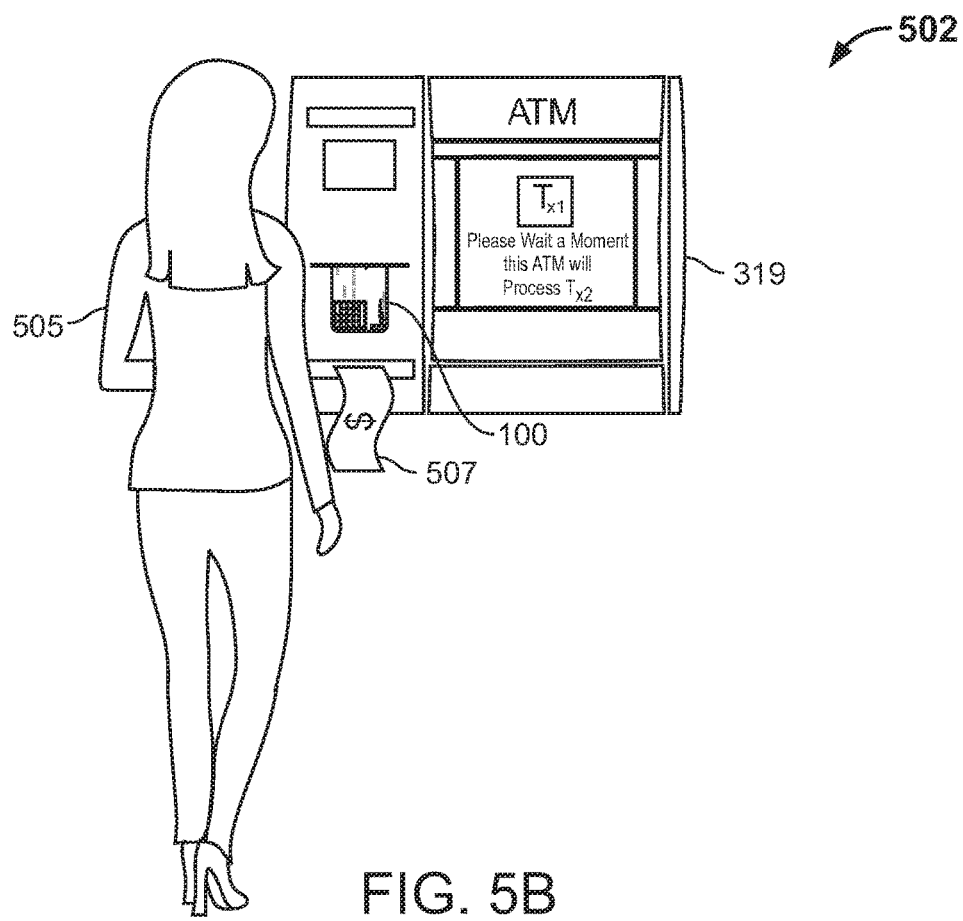
FIG. 5B shows an illustrative apparatus and scenario in accordance with principles of the disclosure.

FIGS. 5A-5B show illustrative scenarios 500 and 502. In scenario 500, user 505 has utilized touch-sensitive surface 105 of smart card 100 to enter transaction information. Based on the entered transaction information, smart card 100 has formulated transaction instructions 501 and 504. Transaction instructions 501 and 504 are stored locally on smart card 100. Transaction instructions 501 and 504 are executable by ATM 319 (shown in FIG. 3).

Scenario 500 shows that smart card 100 and ATM 319 communicate using communication channel 503. Communication channel 503 may be established when smart card 100 is within a threshold distance of ATM 319. For example, communication channel 503 may be an NFC channel established when smart card 100 and ATM 319 are within an NFC communication range of each other.

In other embodiments, communication channel 503 may be a longer-range Wi-Fi communication channel. For example, using stylus 103, user 505 may enter the transaction information into smart card 100 from within a familiar zone, such as their home. User 505 may pass ATM 319 on the way to or home from work. Using a wireless network at home or work, user 505 may initiate a transfer of transaction instructions 501 and 504 to ATM 319 over communication channel 503. Inserting smart card 100 into ATM 319 may trigger execution of the transaction instructions 501 and 504 previously transferred to ATM 319.

Scenario 500 shows that communication channel 503 is a wireless communication channel. In other embodiments, communication channel may be a wired or contact based communication channel.

FIG. 5B shows scenario 502. In scenario 502, user 505 has inserted smart card 100 into a card reader of ATM 319. As discussed above, user 505 may have transferred transaction instructions 501 and 504 specifically to ATM 319 because ATM 319 is at a convenient location.

Transaction instructions 501 and 504 may include timing restrictions. The timing restrictions may limit execution of transaction instructions 501 and 504 to different time windows, as defined by the timing restrictions. For example, if transaction instructions 501 are not executed within a time window, smart card 100 and/or ATM 319 may delete transaction instructions 502. If transaction instructions 501 are not executed within the time window, smart card 100 may delete transaction instructions 501.

In scenario 502, user 505 inserts smart card 100 into ATM 319. ATM 319 recognizes, based on communication with smart card 100, that transaction instructions 501 and 504 previously received are associated with smart card 100. ATM 319 may recognize that transaction instructions 501 and 504 are associated with smart card 100 based on data encoded in chip 101 or a magnetic stripe (not shown) of smart card 100.

In some embodiments, when smart card 100 is inserted into ATM 319, smart card 100 may inform ATM 319 that transaction instructions 501 and 504 are ready to be executed by ATM 319. Smart card 100 may continue to store a copy of transaction instructions 501 and 504 even after transferring transaction instructions 501 and 504 to ATM 319. Transaction instructions 501 and 504 may be deleted after transaction instructions 501 and 504 are executed by ATM 319.

Scenario 502 shows ATM 319 first executing transaction instructions 501 ("$T_{x1}$"). For example, transaction instructions 501 may trigger execution of an account transfer. Subsequent execution of transaction instructions 504 ("$T_{x2}$") may then dispense cash 507 to user 505 by withdrawing the funds transferred by transaction instructions 501 to the destination account. The amount of cash 507 is defined by transaction instructions 504. In scenario 502, ATM 319 executes transaction 501 (e.g., account transfer) and transaction 504 (dispenses cash 407 to user 505) without user 505 entering any data at ATM 319.

Figure 6:
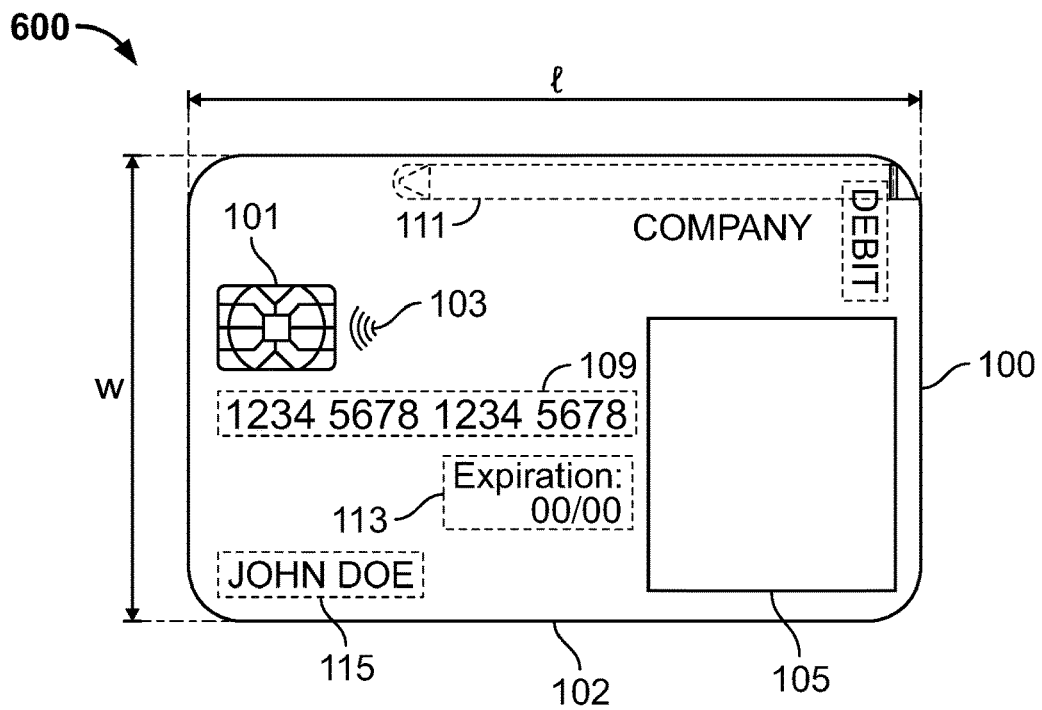
FIG. 6 shows illustrative apparatus in accordance with principles of the disclosure.
Figure 6:
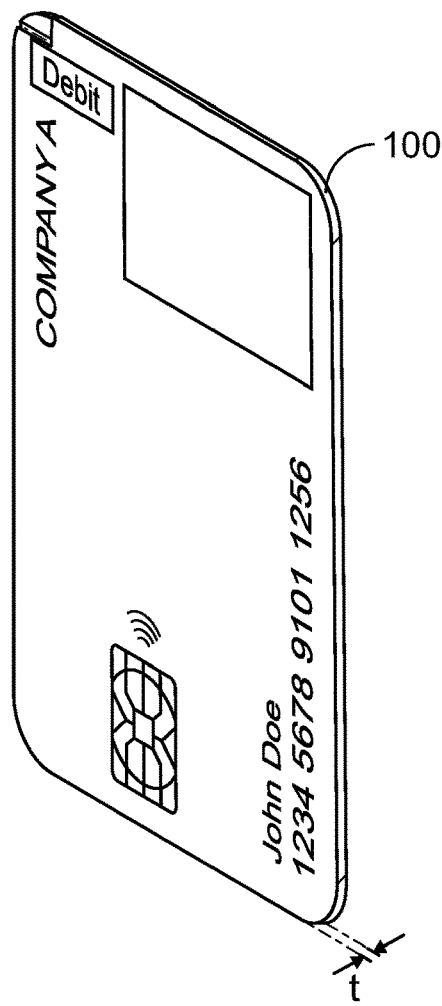

FIG. 6 shows an illustrative view of smart card 100. FIG. 6 shows that smart card 100 has width w and length l. Smart card 100 may be any suitable size. For example, width w may be 53.98 millimeters ("mm"). Length l may be 85.60 mm. Smart card 600 has a thickness t. An illustrative thickness may be 0.8 mm. FIG. 6 shows that thickness t may be 0.8 mm when stylus 103 is seated in receptacle 111.

An exemplary form factor of smart card 100 may be 53.98 mm×85.60 mm×0.8 mm. This exemplary form factor may allow smart card 600 to fit into a user's wallet or pocket. This exemplary form factor may allow smart card 600 to fit into a card reader of an ATM. Views 600 show that receptable 111 and stylus 103, even when stylus 103 is seated in receptable 111, do not increase thickness t of smart card 100.

Figure 7:
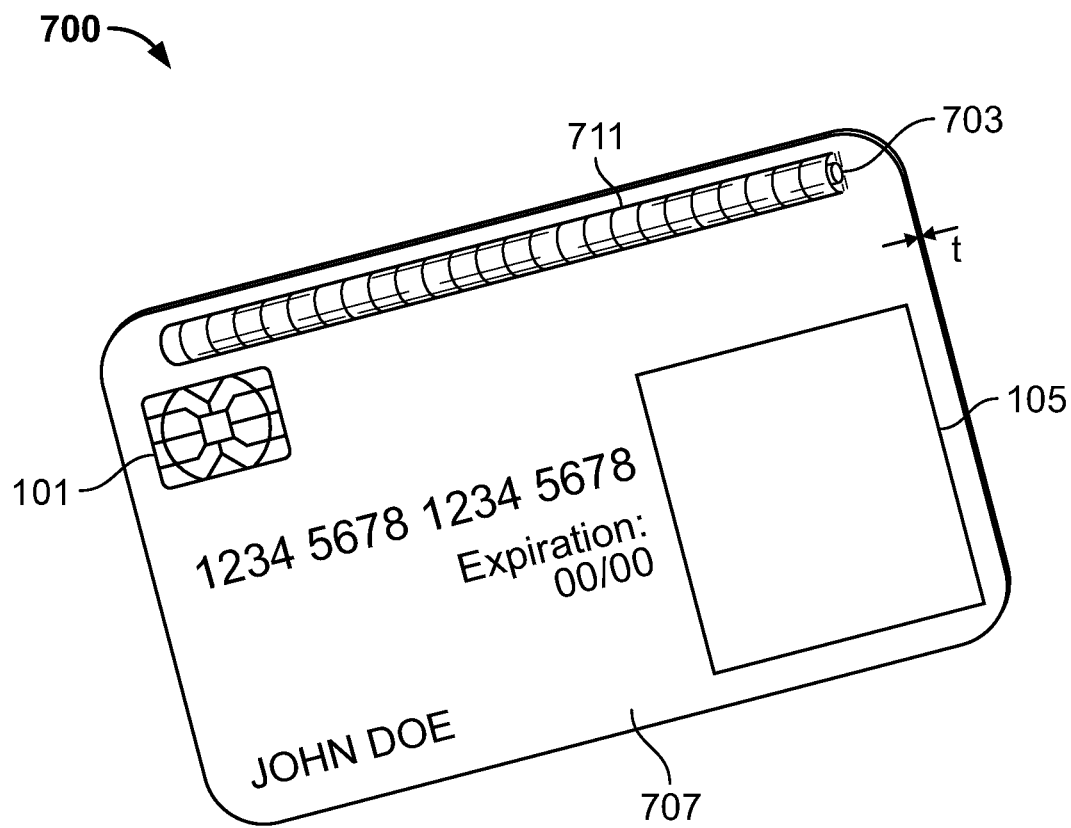
FIG. 7 shows illustrative apparatus in accordance with principles of the disclosure.

FIG. 7 shows illustrative smart card 700. Smart card 700 may include one or more features of smart card 100 (shown in FIG. 1) and smart card 200 (shown in FIG. 2). For example, smart card 700 includes touch-sensitive surface 105 (shown in FIG. 1) and a thickness t (shown in FIG. 6).

Smart card 700 includes stylus 703 which is seated in receptacle 711. Receptacle 700 protrudes from front face 707 of smart card 700. Receptacle 700 may increase a thickness t of smart card 700. By protruding from front face 707, receptacle 711 may form a key that restricts an orientation of how smart card 700 may be inserted into a card reader. For example, receptacle 711 may only allow smart card 700 to be inserted into a card reader such that chip 101 will be positioned to be read by the card reader.

Figure 8:
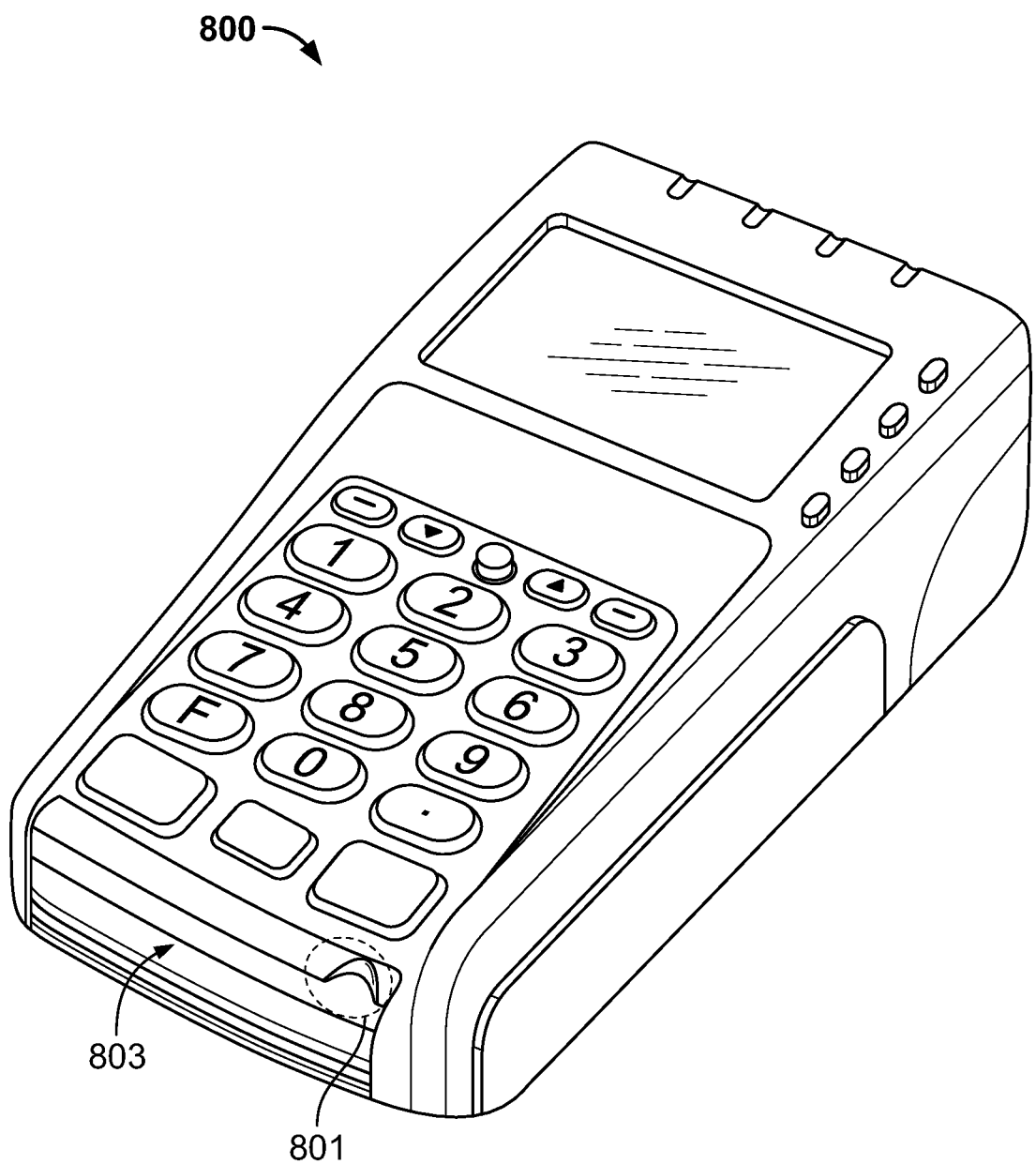
FIG. 8 shows illustrative apparatus in accordance with principles of the disclosure.

FIG. 8 shows illustrative card reader 800. Card reader 800 includes keyway 801. Keyway 801 provides a pass-through for protruding receptacle 711 (shown in FIG. 7) when smart card 700 is inserted into slot 803. A position of keyway 801 may prevent smart card 700 from being inserted with into slot 803 unless receptacle 711 is aligned with keyway 801. Keyway 801 only allows smart card 700 to be inserted into slot 803 such that chip 101 will be positioned to be read by card reader 800.

Thus, methods and apparatus for a STYLUS ENABLED SMART CARD are provided. Persons skilled in the art will appreciate that the present invention can be practiced by other than the described embodiments, which are presented for purposes of illustration rather than of limitation, and that the present invention is limited only by the claims that follow.

What is claimed is:

1. A smart card that improves transaction processing efficiency of an Automated Teller Machine ("ATM") positioned at a first location, the smart card comprising:
   a communication interface;
   a housing;
   a keypad;
   a microprocessor embedded in the housing;
   a battery for powering the communication interface and the microprocessor;
   a stylus configured to be seated within, and removable from, the housing;
   a touch-sensitive surface that captures motion of the stylus against the touch-sensitive surface provided by a user of the smart card;
   an EMV chip, located within the housing and in electronic communication with the communication interface and the microprocessor, wherein the EMV chip contains a built-in security protocol; and
   executable instructions stored in a non-transitory memory, that when executed by the microprocessor:
      at a second location, save the captured motion of the stylus locally on the smart card;
      translate the captured motion into transaction instructions in a format acceptable by the ATM;
      encrypt the transaction instructions;
      calculate a pre-determined time period based on a distance between the first location and the second location;
      receive an authentication information entered on the keypad by the user;
      encrypt, by the EMV chip, the authentication information;
      store, by the EMV chip, the authentication information on the EMV chip;
      establish, by the EMV chip through the communication interface, a contact based wired communication channel with the ATM within the pre-determined time period; and
      initiate a transaction at the ATM without requiring any input from the user at the ATM by,
         receiving a request for the authentication information from the ATM,
         transferring the authentication information to the ATM, and
         transferring the transaction instructions to the ATM.

2. The smart card of claim 1, wherein the captured motion of the stylus corresponds to a user's handwritten instructions, the smart card further comprising a display screen configured to present the user's handwritten instructions, as typed instructions translated by the microprocessor.

3. The smart card of claim 2, wherein the executable instructions, when executed by the microprocessor:
   determine at least two transaction options based on the user's handwritten instructions; and
   present the at least two options for selection on the display screen.

4. The smart card of claim 1, the executable instructions when executed by the microprocessor:
   translate the captured motion into:
      a personal identification number ("PIN") associated with the smart card; and
      an amount of cash desired to be withdrawn from the ATM.

5. The smart card of claim 1, the executable instructions, when executed by the microprocessor:
   establish a wireless communication channel with the ATM; and
   initiate the transaction at the ATM by transferring the transaction instructions to the ATM over the wireless communication channel.

6. The smart card of claim 1, wherein the housing and the stylus seated within the housing, collectively have a thickness that is not greater than 0.8 millimeters ("mm").

7. The smart card of claim 1, wherein:
the stylus seated within the housing forms a key that directs insertion of the smart card into a card reader of the ATM;
the key mates with a corresponding keyway defined by the card reader; and
the key and the keyway collectively limit an orientation of the smart card when inserted into the card reader.

8. The smart card of claim 1, wherein:
the touch-sensitive surface comprises:
an inactive state in which the touch-sensitive surface is unable to capture the motion;
an active state in which the touch-sensitive surface is capable of capturing the motion; and
the microprocessor toggles the touch-sensitive surface from the inactive state to the active state in response to determining that the communication interface is within a communication range of the ATM;
wherein, the inactive state is a default state.

9. A system for improving transaction processing efficiency of an Automated Teller Machine ("ATM") positioned at a first location, the system comprising:
a smart card having a thickness not greater than 0.8 millimeters ("mm") and a surface area not greater than 86 mm×54 mm, wherein the smart comprises:
a communication interface comprising at least one electrical contact;
a microprocessor;
a keypad;
an EMV chip, in electronic communication with the communication interface and the microprocessor, wherein the EMV chip contains a built-in security protocol;
a user input system in electronic communication with the microprocessor, the user input system comprising:
a stylus;
a first touch-sensitive surface that captures motion of the stylus applied to the first touch-sensitive surface and corresponding to handwritten instructions of a user of the smart card;
an input controller that deciphers the handwritten instructions of the user and formulates transaction instructions based on the captured motion in a format acceptable by the ATM;
an encryption controller that encrypts the transaction instructions; and
executable instructions stored in a non-transitory memory, that when executed by the microprocessor:
at a second location, store the transaction instructions locally on the smart card;
calculate a pre-determined time period based on a distance between the first location and the second location;
receive an authentication information entered on the keypad by the user;
encrypt, by the EMV chip, the authentication information;
store, by the EMV chip, the authentication information on the EMV chip;
establish, by the EMV chip through the communication interface, a secure communication link with the ATM within the pre-determined time period; and
initiate a transaction at the ATM without the ATM prompting for any inputs from the user at the ATM by:
receiving a request for the authentication information from the ATM,
transferring the authentication information to the ATM, and
transferring the transaction instructions to the ATM.

10. The smart card of claim 9, further comprising:
a front face and a back face;
the first touch-sensitive surface that comprises a first writing surface on the front face; and
a second touch-sensitive surface that comprises a second writing surface on the back face.

11. The smart card of claim 9 defining, within the thickness, a receptacle for the stylus.

12. The smart card of claim 9, wherein the stylus is configured to be seated within receptacle such that the stylus does not increase the thickness or the surface area of the smart card.

13. The smart card of claim 11, wherein:
the stylus seated in the receptacle, forms a key that mates with a corresponding keyway defined by a card reader of the ATM; and
the key and the keyway limit an orientation of the smart card when inserted into the card reader.

14. The smart card of claim 9 further comprising a voice controller that generates an audio message confirming the transaction instructions formulated by the input controller.

15. A method of improving transaction processing efficiency of an Automated Teller Machine ("ATM") positioned at a first location, the method comprising:
capturing, by a microprocessor of a smart card, at a second location, motion of a stylus applied to a first touch-sensitive surface of the smart card, wherein the motion corresponds to handwritten instructions of a user of the smart card, and wherein the smart card comprises the microprocessor, a non-transitory memory, a communication interface, a keypad, the first touch-sensitive surface and an EMV chip, with a built-in security protocol, that is in electronic communication with the communication interface and the microprocessor;
formulating, by the microprocessor, transaction instructions based on the captured motion in a format acceptable by the ATM;
encrypting, by the microprocessor, the transaction instructions;
at the second location, storing, by the microprocessor, the encrypted transaction instructions locally on the smart card;
calculating, by the microprocessor, a pre-determined time period based on a distance between the first location and the second location;
receiving, by the microprocessor, an authentication information entered on the keypad by the user;
encrypting, by the EMV chip, the authentication information;
storing, by the EMV chip, the authentication information on the EMV chip;
establishing, by the EMV chip through the communication interface, a secure communication link with the ATM with the pre-determined time period; and
initiating, by the microprocessor, a transaction at the ATM without receiving any input from the user at the ATM by:
receiving, by the microprocessor, a request for the authentication information from the ATM,
transferring, by the EMV chip, the authentication information to the ATM, and
transferring, by the microprocessor, the transaction instructions to the ATM.

16. The method of claim 15, further comprising:
capturing, by the microprocessor, the motion of the stylus at a first time; and
transferring, by the microprocessor, the transaction instructions to the ATM at a second time.

17. The method of claim 15 further comprising:
capturing, by the microprocessor, first motions of the stylus from the first touch-sensitive surface on a front face of the smart card;
capturing, by the microprocessor, second motions of the stylus from a second touch-sensitive surface on a back face of the smart card; and
formulating, by the microprocessor, the transaction instructions based on the first and second motions.

* * * * *